July 9, 1957        F. S. FLICK        2,798,778
PISTON AND CYLINDER DEVICE WITH REPLACEABLE PISTON ROD SEAL
Filed Dec. 16, 1955
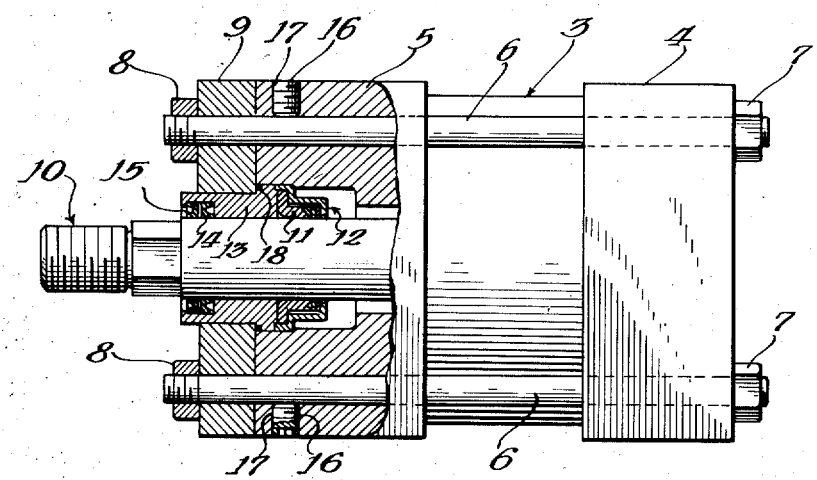
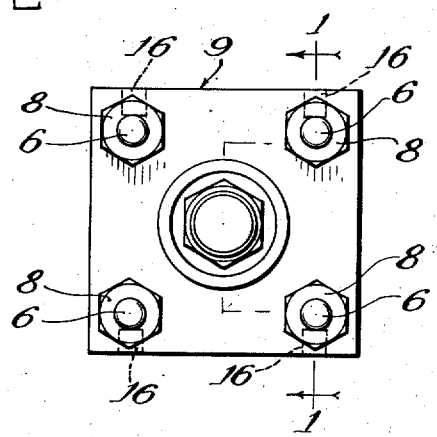
Inventor:
Francis S. Flick
By: Schroeder, Hofgren,
Brady & Wegner
Attorneys

United States Patent Office 2,798,778
Patented July 9, 1957

2,798,778

PISTON AND CYLINDER DEVICE WITH REPLACEABLE PISTON ROD SEAL

Francis S. Flick, Melrose Park, Ill., assignor to Flick-Reedy Corporation, a corporation of Illinois Application December 16, 1955, Serial No. 553,591

4 Claims. (Cl. 309—2)

This invention relates to a hydraulic or pneumatic piston and cylinder device and more particularly to a structure in such devices permitting replacement of a piston rod seal without disassembly of the entire device.

This invention is applicable to piston and cylinder devices held in assembled relation by tie rods passing through the heads on opposite ends of a cylinder tube. Ordinarily, the piston rod extends through one of the heads. The head through which the rod extends is referred to as a double ended piston and cylinder device, the latter to have a piston rod extending through both heads. The head through which which the rod extends carries a piston rod seal preventing the leakage of gas or liquid, as the case may be, out of the cylinder. These seals are subject to greater wear than other parts of the device so that maintenance engineers prefer a structure in which the rod seal is replaceable.

The problem in replacing the rod seal arises by virtue of the fact that the cylinder tube and its heads may not be allowed to part in the field in order to protect the accurately made seals between these parts. In air and low pressure hydraulic cylinders of about 8 inches in diameter and larger, there is sufficient space in the head to provide a retainer for the piston rod seal separate from the tie rods used to assemble the entire device. On smaller cylinders and on almost all sizes of high pressure hydraulic cylinders, however, there is not sufficient room to provide such a separate retainer. Thus, on the smaller cylinders the tie rods also serve the purpose of holding a retainer plate for the piston rod seal. In order to remove the seal, the stress on the tie rods must be relieved which in turn would allow the cylinder and heads to part.

The primary object of this invention is to provide a new and improved piston and cylinder structure permitting replacement of the rod seal in the field.

Another object is to provide structure which will retain a piston and cylinder device in assembled relation even though the usual tie rod nuts may be removed from the tie rods in order to release the piston rod seal structure for replacement.

A further object of the invention is to provide an improved structure for tie rod assembled piston and cylinder devices of under nominal 8 inch bore by which the rod seals may easily be replaced in the field.

Other objects, features and advantages of the present invention will be understood from the following description of a preferred embodiment illustrated in the accompanying drawing in which:

Figure 1 is a side elevational view of a piston and cylinder device, partly in section, in order to show the structure of the present invention therein. Figure 1 is taken substantially along line 1—1 in Figure 2.

Figure 2 is an end view of the device illustrated in Figure 1 looking toward the left hand side of Figure 1.

The figures of the drawing illustrate a typical high pressure hydraulic piston and cylinder device of the type which is held assembled by tie rods. The cylinder tube 3 is assembled with a cap 4 on the right hand end as viewed in Figure 1 which may generically be called a head and a head 5 on the left hand end. It will be understood that sealing structure is provided between the ends of the tube and the head. This structure is of known character and forms no part of the present invention.

The heads are held in assembled relation on the cylinder tube by a plurality of tie rods 6, in this instance four in number since the heads are square in shape with the tie rods in the corners. Ordinarily, the tie rods are arranged so that they almost contact the outer surface of the cylinder tube. Retaining nuts 7 are shown as bearing against the cap 4 and similar retaining nuts 8 are shown as bearing against the retainer plate 9 which is abutting against the head 5.

A piston rod 10 connected with a piston inside the cylinder passes through a seal which is carried by the head 5 of the device. In the present instance, the seal may be a leather flange packing 11 within a cage 12 supported in an appropriate sized bore within the head. The retainer plate 9 holds the seal in place by bearing against a piston rod bushing 13 which in turn presses against the flange seal 11. Oil and dirt wipers 14 and 15 respectively are mounted within the piston rod bushing.

From the description of the piston rod seal above, it will be obvious that the seal could not be removed without removing the retainer plate 9 from the tie rods 6. Previous to this time, no acceptable method has been provided for permitting the removal of the piston rod seal in the field. This was particularly true since no appreciable movement can be permitted between the cylinder tube 3 and the heads. Such movement may permit dirt and chips to enter the cylinders and should such foreign matter remain in the cylinder, the seals often are damaged requiring replacement.

As previously mentioned, air and low pressure hydraulic cylinders above 8 inches in diameter have a retainer plate 9 of sufficient size to permit a separate plate to be carried between the tie rods for the purpose of holding the piston rod bushing in place. In the larger cylinders this separate plate may be removed without disturbing the nuts 7 or 8 on the tie rods, thus permitting a changing of the seal without affecting the alignment of the heads and cylinder tube. The smaller cylinders, that is, those below 8 inches in nominal diameter do not have sufficient room between the tie rods 6 to allow a separate retainer plate for the piston rod bushing. The only manner in which the piston rod bushing may be replaced is to remove the entire retainer plate 9. In order to do this, it is obvious that the retaining nuts 8 on the tie rods must be removed which will release the only means available for holding the cylinder and its heads in assembled relation.

The present invention provides a structure for retaining the assembled relation of the device even though the retainer plate may be removed from the tie rods. When the cylinder is assembled at the factory, the tie rods are ordinarily stressed in tension a predetermined amount by pulling up on the retaining nuts to a specified torque. After the cylinder is so assembled, set screws 16 are threaded into prepared bores 17 in the head 5 in order to contact and bear against each of the tie rods. These set screws are provided with a hex-type internal socket for the reception of a wrench so that they may be tightened to a position below the outer surfaces of the head. The set screws are pulled up against the tie rods after the rods are prestressed by the torque applied to the retaining nuts 7 and 8. A sufficient amount of side thrust can be applied to the tie rods to bind them in the holes through the head through which the tie rods pass. Once tightened, the set screws 16 will remain without being disturbed. Should the cylinder be taken to a central repair place or be returned to the manufacturing establishment, it is, of course, possible to loosen them in order to remove the tie rods from the head 5.

With the structure of the present invention, a means separate from the tie rods' retaining nuts is provided for maintaining the cylinder tube and heads in proper assembled relation. While the set screws are not a positive type of retaining means as compared to the retaining nuts 7 and 8, they effectively prevent relative movement between the tube and heads when the retaining nuts 8 are removed. Many cylinders are used with machine tools and will have an accumulation of chips, grease, dirt, etc., on and around the cylinder after some time. The present invention permits the opening of the cylinder to an extent permitting the changing of the rod seal. It does not permit the cylinder and heads to part so that the dirt and chips could enter the cylinder. Additionally, the present invention permits the changing of a rod seal on a cylinder which is suspended by its cap end. The set screws prevent the cylinder from falling apart when the retainer plate is removed.

One important feature of the present invention is that it permits the use of a rod seal so constructed that it may be removed and replaced in the cylinder structure. By simply removing the retainer plate, the piston rod bushing 13 and the cage 12 for holding the seal assembly may be removed from the piston rod. In some instances, the bushing and cage may be secured together as a unit so as to be replaceable in one piece. In other instances, the bushing, cage and flange seal may all be separate pieces easily replaceable in proper position relative to each other. An O-ring 18 between the bushing and the retainer plate should be properly positioned upon removing and replacing the rod seal structure. This O-ring may be quite easily placed in the groove formed in the outer portion of the rod bushing next adjacent the head 5 and retainer plate 9. Thus, the retainer plate engages the O-ring to prevent leakage when the cylinder is reassembled.

The present invention thus solves a problem which previous cylinder structures have universally presented. The rod seal structures of cylinders may easily be replaced if provided with the present invention. Ordinarily, the rod seals have a service life of some time, but generally shorter than the heads and cylinder tube and thus may need replacement. One of the greatest difficulties is in making the replacement in the field where dirt and chips might get into the cylinder and ruin the seal structures. With the present invention, the cylinder may not need come apart merely for the purpose of replacing the rod seal. About one-sixteenth of an inch of movement may be permitted between the cylinder tube and heads without admitting dirt, etc. The present invention retains the cylinder in assembled relation without movement between parts. This also permits the rod seal to be changed in a cylinder which is suspended vertically by a cap end mounting.

One important feature of the present invention is that it permits the use of a cartridge type seal for the piston rod, that is, the piston rod bushing 13 and the cage 12 for holding the seal assembly including the flange seal 11, either fastened together or of separate parts. In either case, the rod seal is readily accessible for replacement. The only other piece from the rod seal structure is the O-ring 18 between the bushing and the retainer plate. This O-ring may, however, be quite easily placed in the groove maintained for receiving it when the retainer plate is removed from the head 5 of the piston and cylinder assembly. Engineers charged with the maintenance of hydraulic piston and cylinder devices have long sought standards which would require a replaceable rod seal. One of the difficulties has been in structures of the cylinders which heretofore have not permitted a change of such rod seals in the field. The present invention solves this problem.

The foregoing detailed description has been given for clearness of understanding only, and no unnecessary limitations should be understood therefrom, for some modifications will be obvious to those skilled in the art.

I claim:

1. A piston and cylinder device having a replaceable piston rod seal, comprising: a cylinder tube and a head at each end with tie rods extending through the heads beside the cylinder tube to hold the device in assembled relation; a piston rod seal carried by one head permitting movement of a piston rod through the head; a retainer plate abutting said one head for holding the seal in the head, said tie rods extending through the retainer plate and having retaining nuts abutting the exposed outer surface of the plate; lock members secured in said one head, one engaging each tie rod to prevent substantial relative movement between the rods and head, said tie rods and lock members cooperatively holding the heads and cylinder tube in assembled relation upon removal of said tie rod nuts to allow removal of the retainer plate and piston rod bushing.

2. A piston and cylinder device having a replaceable piston rod seal, comprising: a cylinder tube and a head at each end with tie rods extending through the heads beside the tube to hold the device in assembled relation; a piston rod seal carried by one head permitting movement of a piston rod through the head; a retainer plate abutting said one head for holding the seal in the head, said tie rods extending through the retainer plate and having retaining nuts abutting the exposed outer surface of the plate; and a plurality of thrust members securing the tie rods and said one head against substantial relative movement to hold the heads and tube together during replacement of said rod seal, said thrust members having threaded shanks removably received in lateral threaded bores in the head intersecting said tie rods permitting frictional locking of the tie rods in the head.

3. In a piston and cylinder device, a cylinder tube and a head at each end with tie rods holding the heads and tube in assembled relation, an annular piston rod seal carried in one head for reciprocally supporting a piston rod, a retainer plate impaled on said tie rods and abutting said one head to hold said rod seal in said one head, and thrust screws in said one head laterally abutting said tie rods preventing relative substantial movement between the rods and head and holding the head and cylinder in assembled relation during removal of the retainer plate from the rods for removal and replacement of the piston rod seal.

4. In a piston and cylinder device, a cylinder tube and a head at each end in sealing engagement with the tube; tie rods extending through the heads and beside the cylinder tube holding the heads and tube in assembled relation; a piston rod seal carried by one head for reciprocally supporting a piston rod and a retainer plate abutting the head to hold the rod seal therein, said tie rods extending through the plate and having nuts thereon abutting the plate; and thrust screws mounted in said one head respectively directed against the tie rods to bind the tie rods and head together against relative movement, said screws holding the cylinder tube and heads assembled on the tie rods when said nuts are removed for removal of said retainer plate and piston rod seal from the device, said thrust screws being mounted in threaded bores in said head and having a length avoiding protrusion outwardly of the head surface.

References Cited in the file of this patent

UNITED STATES PATENTS

| 1,400,422 | Curtis | Dec. 13, 1921 |
| 1,905,510 | Russell | Apr. 25, 1933 |
| 2,212,955 | Price et al. | Aug. 27, 1940 |

OTHER REFERENCES

Miller Motor Co. Bulletin A–105g May 3, 1954. Copy in Div. 28.

UNITED STATES PATENT OFFICE

CERTIFICATE OF CORRECTION

Patent No. 2,798,778

July 9, 1957

Francis S. Flick

It is hereby certified that error appears in the printed specification of the above numbered patent requiring correction and that the said Letters Patent should read as corrected below.

Column 1, line 19, for "heads. The head through which the rod extends" read -- heads; but on occasion an application will require what --.

Signed and sealed this 3rd day of September 1957.

(SEAL)
Attest:

KARL H. AXLINE
Attesting Officer

ROBERT C. WATSON
Commissioner of Patents